(12) United States Patent
Jung et al.

(10) Patent No.: US 9,832,065 B2
(45) Date of Patent: Nov. 28, 2017

(54) APPARATUS AND METHOD FOR SOFT-DECISION DEMODULATING IN NON-SQUARE QUADRATURE AMPLITUDE MODULATION

(71) Applicant: ELECTRONICS AND TELECOMMUNICATIONS RESEARCH INSTITUTE, Daejeon (KR)

(72) Inventors: Joon Young Jung, Daejeon (KR); Je Won Lee, Daejeon (KR); Dong Joon Choi, Daejeon (KR); Nam Ho Hur, Sejong (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 15/151,768

(22) Filed: May 11, 2016

(65) Prior Publication Data

US 2016/0337081 A1 Nov. 17, 2016

(30) Foreign Application Priority Data

May 15, 2015 (KR) .......................... 10-2015-0068220

(51) Int. Cl.
*H04L 27/06* (2006.01)
*H04L 27/38* (2006.01)
*H04L 1/00* (2006.01)

(52) U.S. Cl.
CPC ............ *H04L 27/38* (2013.01); *H04L 1/0057* (2013.01)

(58) Field of Classification Search
CPC ......................................................... H04L 27/38
USPC ........................................................... 375/341
See application file for complete search history.

(56) References Cited

U.S. PATENT DOCUMENTS

| 7,321,643 B2 | 1/2008 | Chang et al. | |
| 8,718,205 B1* | 5/2014 | Morais | H04L 27/38 370/329 |
| 2002/0186778 A1* | 12/2002 | Agami | H04L 1/0041 375/261 |
| 2013/0251075 A1 | 9/2013 | Kim et al. | |

FOREIGN PATENT DOCUMENTS

| KR | 10-2001-0010277 A | 2/2001 |
| KR | 10-2004-0100585 A | 12/2004 |

\* cited by examiner

*Primary Examiner* — Lihong Yu

(57) ABSTRACT

Disclosed are an apparatus and a method for soft-decision demodulating in non-square quadrature amplitude modulation. The apparatus includes: a signal receiving unit receiving a quadrature amplitude modulation (QAM) modulated signal at an m modulation degree at a transmitting side; a soft-decision bit calculating unit determining a soft-decision bit value by calculating log likelihood ratios (LLRs) for m bits of the received QAM modulated signal; and a signal decoding unit restoring the received QAM modulated signal based on the determined soft-decision bit value, in which the soft-decision bit calculating unit defines a log likelihood ratio calculation equation by approximating soft-decision boundary points of constellation points for m bits of non-square QAM having odd bits, respectively.

15 Claims, 15 Drawing Sheets

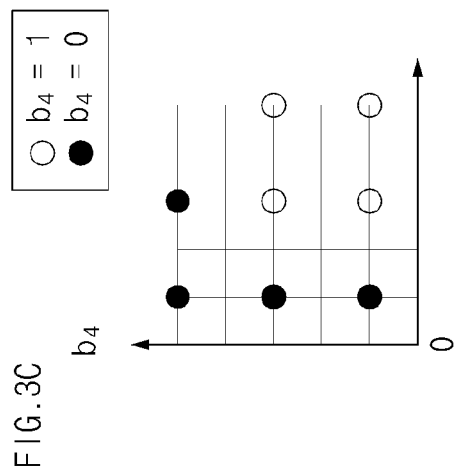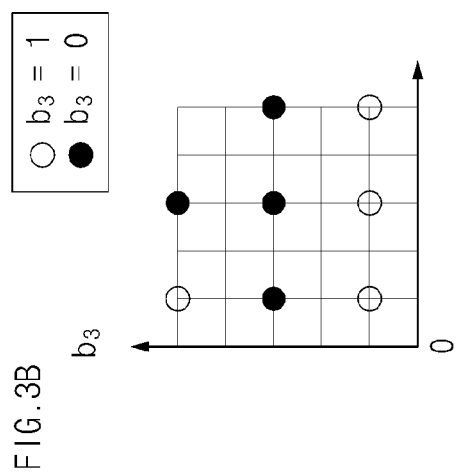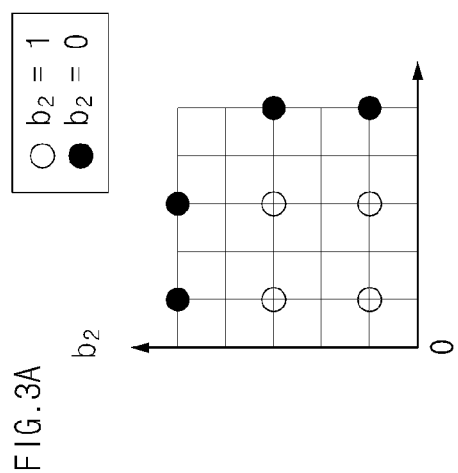

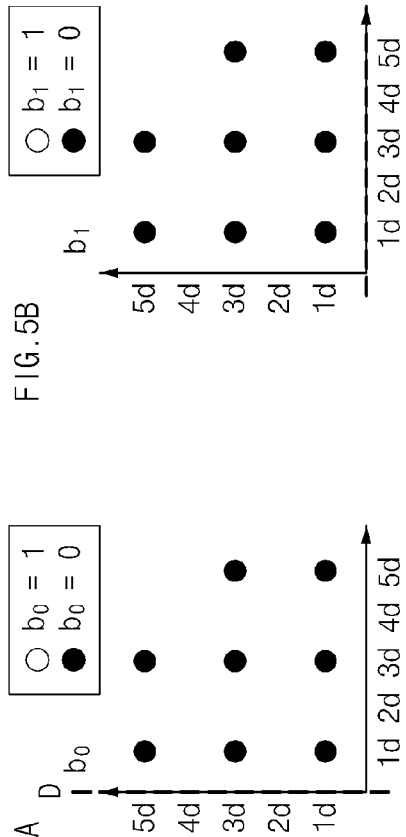
FIG.5A
FIG.5B
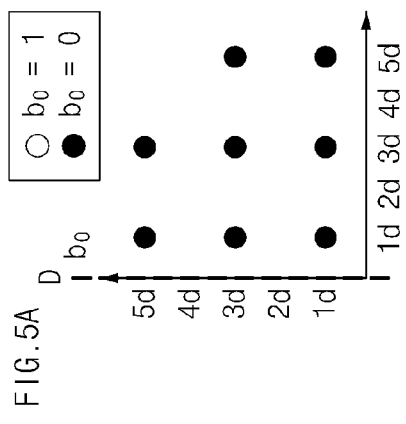
FIG.5C
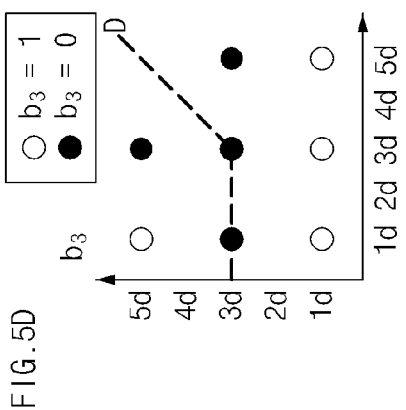
FIG.5D
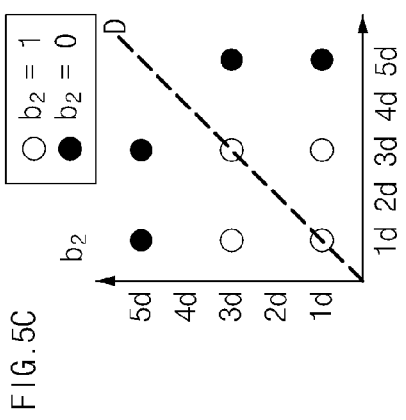
FIG.5E

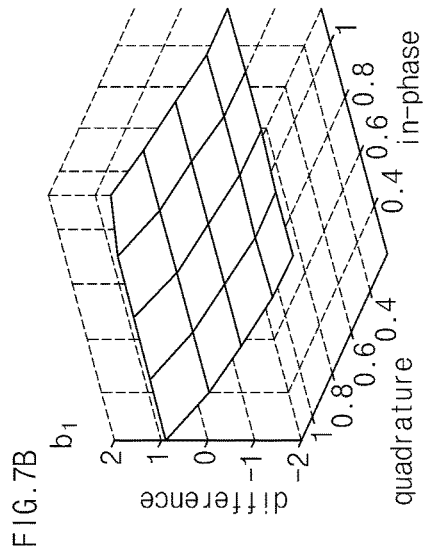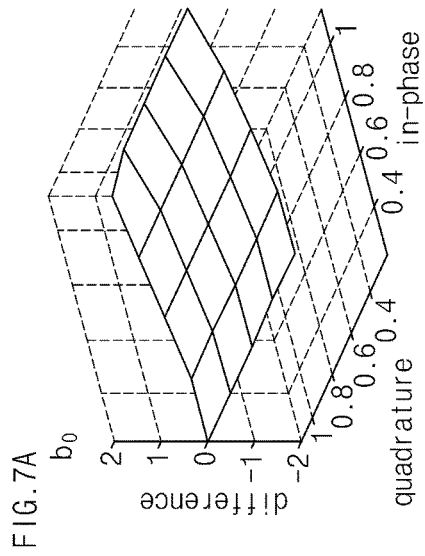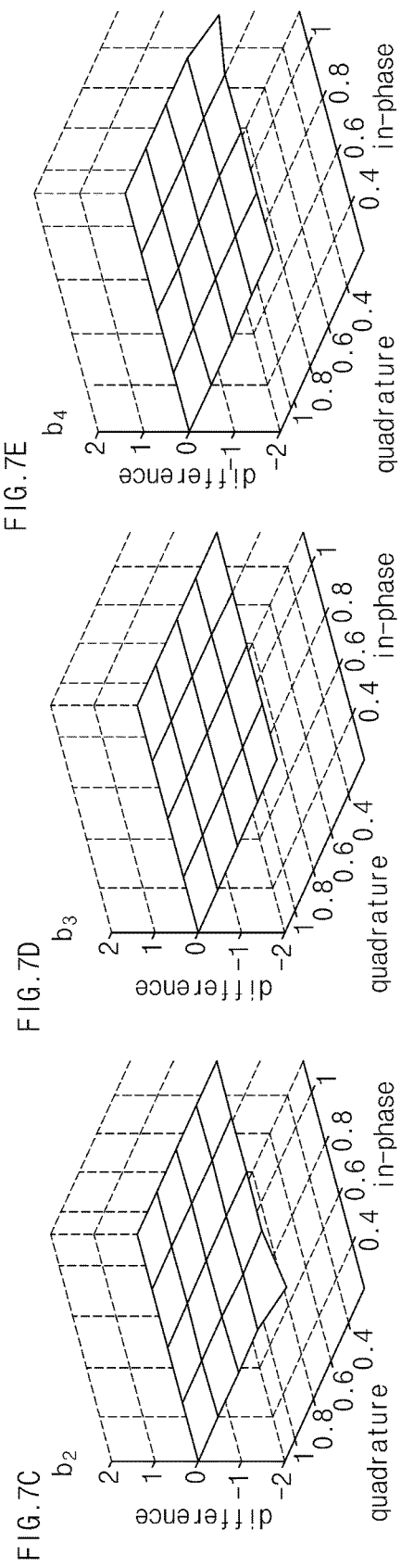

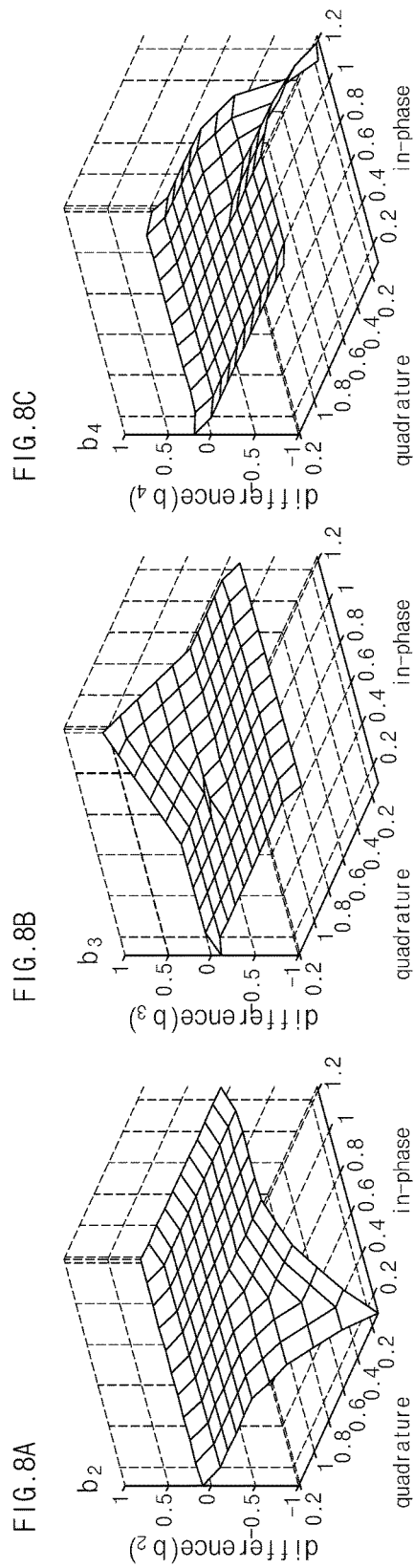

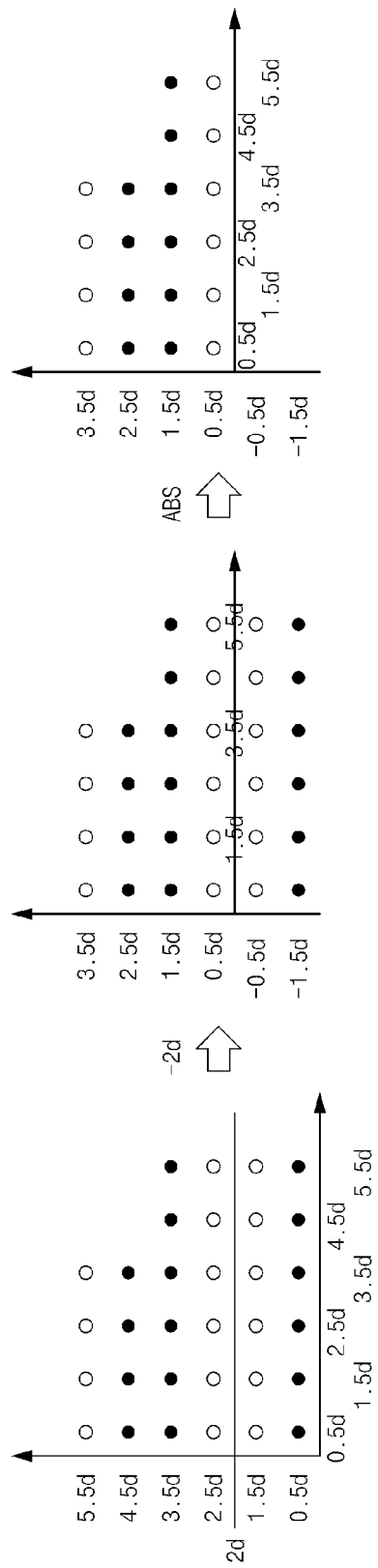

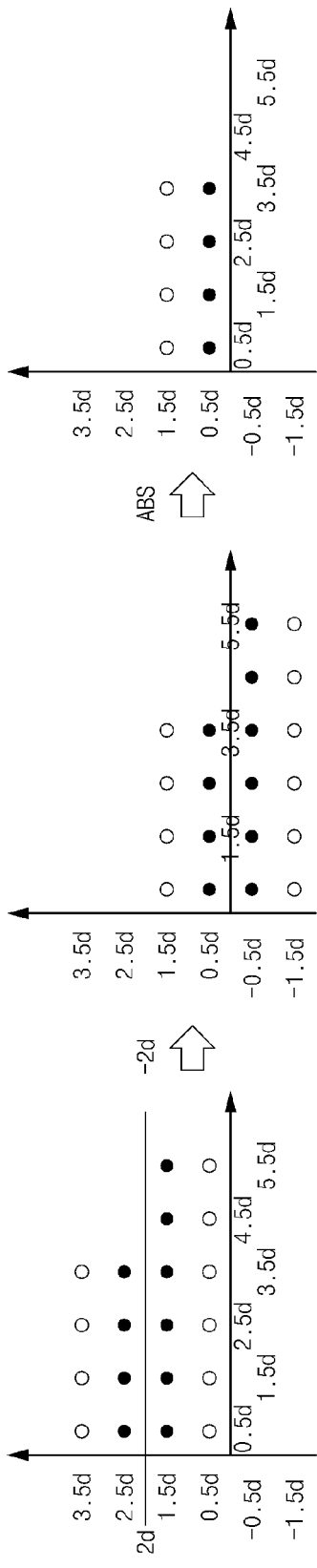

APPARATUS AND METHOD FOR SOFT-DECISION DEMODULATING IN NON-SQUARE QUADRATURE AMPLITUDE MODULATION

CROSS-REFERENCE TO RELATED APPLICATIONS

This application claims priority to and the benefit of Korean Patent Application No. 10-2015-0068220 filed in the Korean Intellectual Property Office on May 15, 2015, the entire contents of which are incorporated herein by reference.

TECHNICAL FIELD

The present invention relates to an apparatus and a method for soft-decision demodulating in non-square quadrature amplitude modulation.

BACKGROUND ART

A data over cable service interface specification (DOCSIS) 3.1 standard supports various data transmission rates through non-square quadrature amplitude modulation (QAM) having odd bits and square QAM having even bits.

A low density parity check (LDPC) code is combined thereto, and as a result, users can acquire a channel capacity which approximates a Shannon limit. A soft decision value is used for LDPC code demodulation and a representative method for calculating the soft decision value is a log likelihood ratio (LLR).

The square QAM can independently separate a bit constituting in-phase and a bit constituting quadrature and a log likelihood ratio calculation equation for the bit constituting the in-phase may be used as a log likelihood ratio calculation equation for the bit constituting the quadrature.

Contrary to this, since it is impossible for the non-square QAM to independently separate the bit constituting the in-phase and the bit constituting the quadrature, in particular, a more complicated calculation process needs to be performed in order to calculate the log likelihood ratio for the high-degree non-square QAM.

SUMMARY OF THE INVENTION

The present invention has been made in an effort to provide an apparatus and a method for soft-decision demodulating in non-square quadrature amplitude modulation which can minimize calculation complexity of a soft decision value used for low density parity check (LDPC) code demodulation in non-square QAM having odd bits and be applied even to high-degree non-square QAM.

The technical objects of the present invention are not limited to the aforementioned technical objects, and other technical objects, which are not mentioned above, will be apparently appreciated to a person having ordinary skill in the art from the following description.

An exemplary embodiment of the present invention provides an apparatus for soft-decision demodulating, including: a signal receiving unit receiving a quadrature amplitude modulation (QAM) modulated signal at an m modulation degree at a transmitting side; a soft-decision bit calculating unit determining a soft-decision bit value by calculating log likelihood ratios (LLRs) for m bits of the received QAM modulated signal; and a signal decoding unit restoring the received QAM modulated signal based on the determined soft-decision bit value.

The soft-decision bit calculating unit may define a log likelihood ratio calculation equation by approximating soft-decision boundary points of constellation points for m bits of non-square QAM having odd bits, respectively.

The soft-decision bit calculating unit may calculate a log likelihood ratio for a first bit by using an I channel value.

The soft-decision bit calculating unit may calculate a log likelihood ratio for a second bit by using a Q channel value.

The soft-decision bit calculating unit may calculate a log likelihood ratio for a third bit by using an equation given below.

$$LLR(b_2) = \begin{cases} |y_Q[n]| - 4d & |y_Q[n]| > |y_I[n]| \\ |y_I[n]| - 4d, & \text{elsewhere} \end{cases}$$

(Where $y_I[n]$ represents an I channel value, $y_Q[n]$ represents a Q channel value, and d represents a distance value of a partition boundary when the bits $b_2=1$ and $b_2=0$)

The soft-decision bit calculating unit may calculate a log likelihood ratio for a fourth bit by using an equation given below.

$$LLR(b_3) \cong \\ \begin{cases} \max(|y_I[n]| - 2d, -|y_Q[n]| + 4d) & |y_Q[n]| > 3d, |y_Q[n]| > |y_I[n]| \\ |y_Q[n]| - 2d, & \text{elsewhere} \end{cases}$$

(Where $y_I[n]$ represents the I channel value, $y_Q[n]$ represents the Q channel value, and d represents a distance value of a partition boundary when the bits $b_3=1$ and $b_3=0$)

The soft-decision bit calculating unit may calculate a log likelihood ratio for a fifth bit by using an equation given below.

$$LLR(b_4) \cong \begin{cases} -|y_I[n]| + |y_Q[n]| & |y_I[n]| > 4d, |y_Q[n]| > 2d \\ \max\begin{pmatrix} -|y_I[n]| + |y_Q[n]| - 2d, \\ |y_Q[n]| - 4d \\ -|y_I[n]| + 2d \end{pmatrix}, & \text{elsewhere} \end{cases}$$

(Where $y_I[n]$ represents the I channel value, $y_Q[n]$ represents the Q channel value, and d represents a distance value of a partition boundary when the bits $b_4=1$ and $b_4=0$)

The soft-decision bit calculating unit may calculate a log likelihood ratio for an even numbered bit of a sixth bit or more by using an equation given below.

$$LLR(b_{k,odd}) = \begin{cases} -(||y_Q[n]| - 2d| - 2d| - d) & k = 5 \\ |b_{k-2,odd}| - d \Big/ 2^{\frac{k-5}{2}}, & k > 5 \end{cases}$$

(Where $y_I[n]$ represents the I channel value, $y_Q[n]$ represents the Q channel value, and d represents the distance value of a partition boundary when the bits $b_k=1$ and $b_k=0$)

The soft-decision bit calculating unit may calculate a log likelihood ratio for an odd numbered bit of a seventh bit or more by using an equation given below.

$$LLR(b_{k,even}) = \begin{cases} -(|||y_I[n]|-2d|-2d|-d) & k=6 \\ |b_{k-2,even}|-d\Big/2^{\frac{k-6}{2}}, & k>6 \end{cases}$$

(Where $y_I[n]$ represents the I channel value, $y_Q[n]$ represents the Q channel value, and d represents the distance value of a partition boundary when the bits $b_k=1$ and $b_k=0$)

Another exemplary embodiment of the present invention provides a method for soft-decision demodulating, including: receiving a quadrature amplitude modulation (QAM) modulated signal at an m modulation degree at a transmitting side; defining a log likelihood ratio calculation equation by approximating soft-decision boundary points of constellation points for m bits of non-square QAM having odd bits; calculating log likelihood ratios (LLRs) for m bits of the received QAM modulated signal by using the defined log likelihood ratio calculation equation; determining soft-decision bit values based on the calculated log likelihood ratios; and restoring the received QAM modulated signal based on the determined soft-decision bit value.

According to exemplary embodiments of the present invention, calculation complexity of a soft decision value used for low density parity check (LDPC) code demodulation in non-square QAM having odd bits is minimized, and as a result, a soft decision value for high-degree non-square QAM is easily calculated.

According to the present invention, the calculation complexity of a soft decision value used for LDPC code demodulation in non-square QAM is minimized, and as a result, it is easy to implement hardware.

The exemplary embodiments of the present invention are illustrative only, and various modifications, changes, substitutions, and additions may be made without departing from the technical spirit and scope of the appended claims by those skilled in the art, and it will be appreciated that the modifications and changes are included in the appended claims.

BRIEF DESCRIPTION OF THE DRAWINGS

FIGS. 2A to 9I are diagrams referred for describing an operation of an apparatus for soft-decision demodulating in non-square quadrature amplitude modulation according to the present invention.

Figure 1:
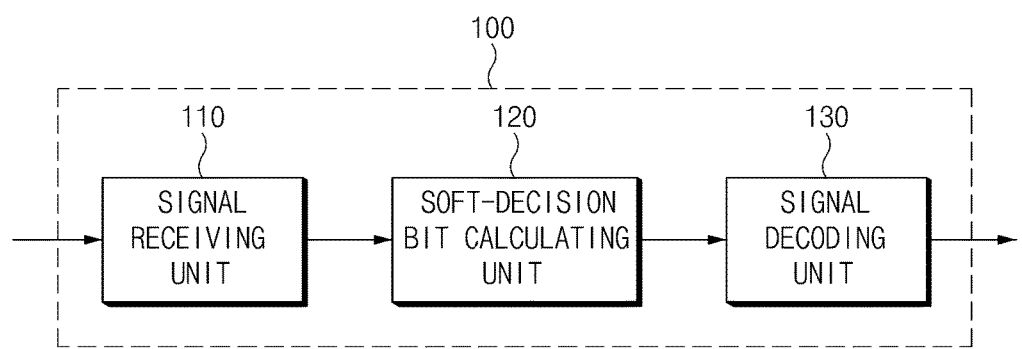
FIG. 1 is a diagram illustrating a configuration of an apparatus for soft-decision demodulating in non-square quadrature amplitude modulation according to the present invention.
Figure 2A:
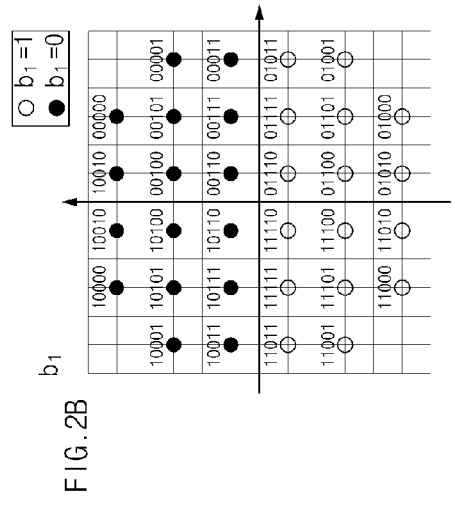
Figure 2B:
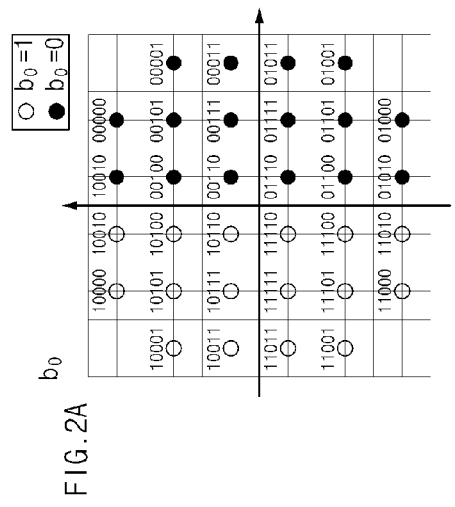
Figure 2C:
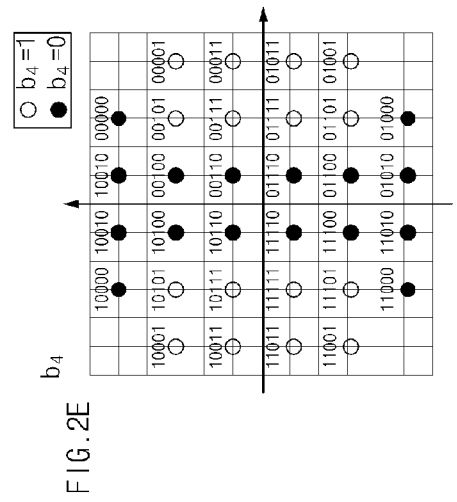
Figure 2D:
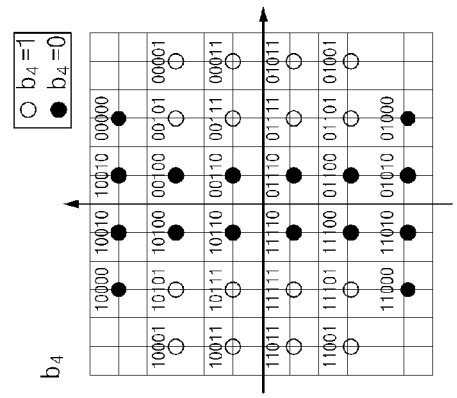
Figure 2E:
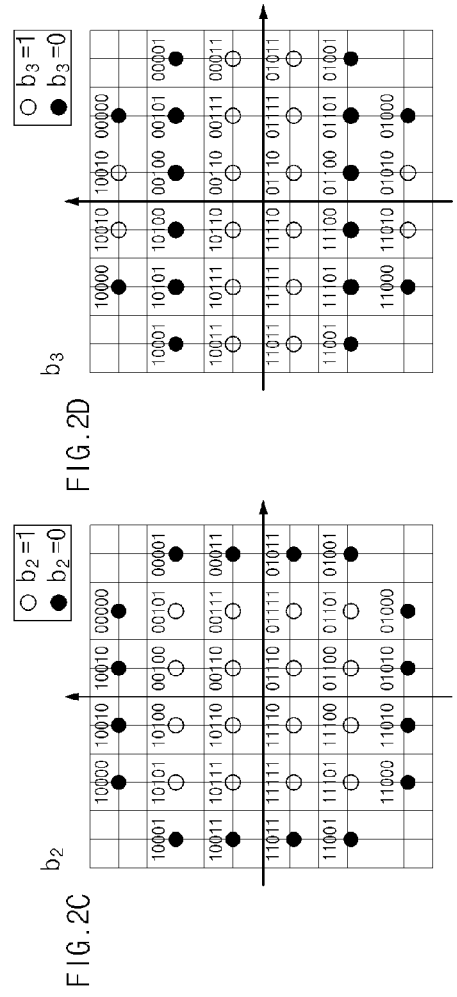
Figure 4A:
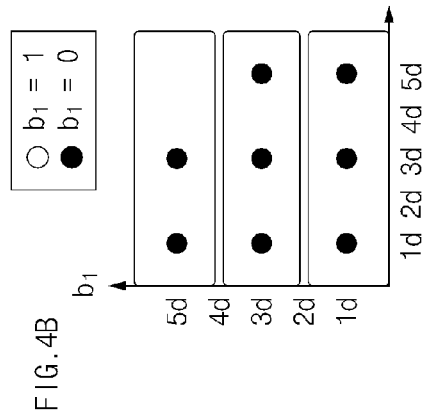
Figure 4B:
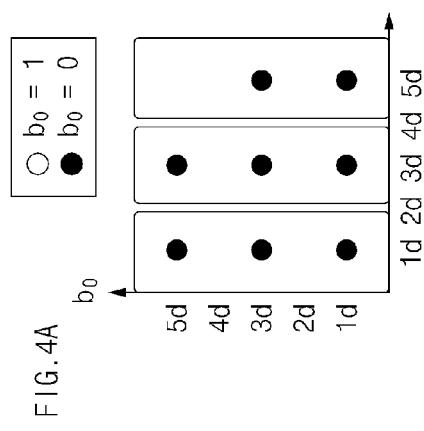
Figure 4C:
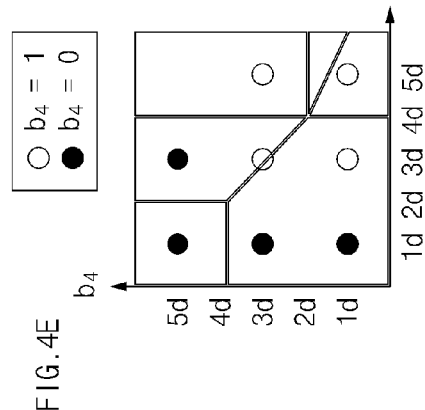
Figure 4D:
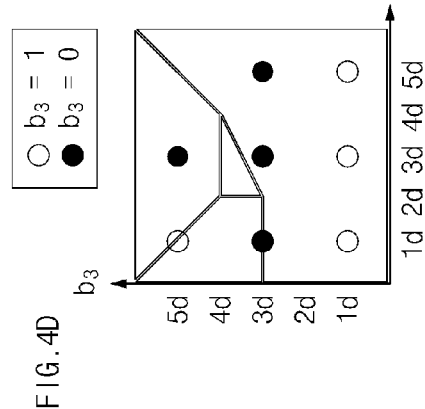
Figure 4E:
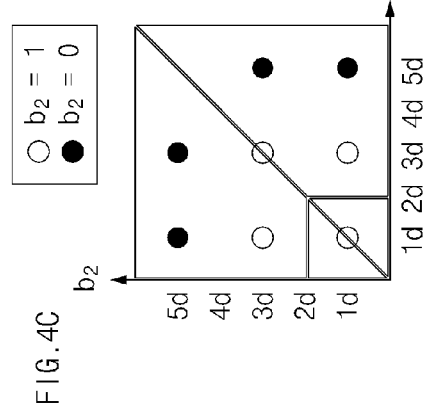
Figure 6A:
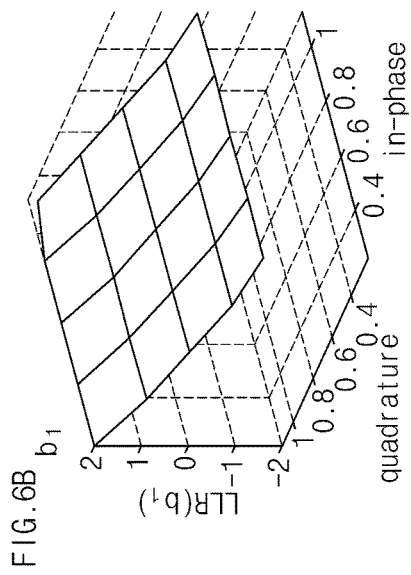
Figure 6B:
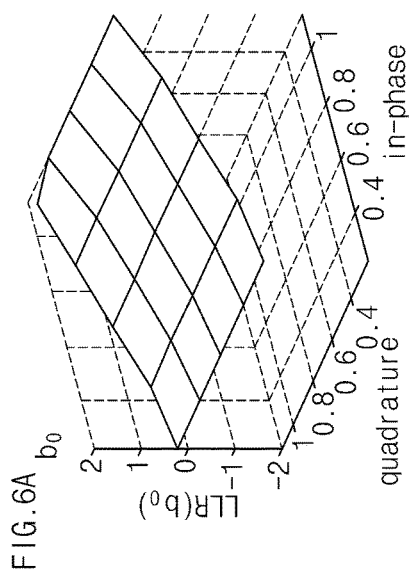
Figure 6E:
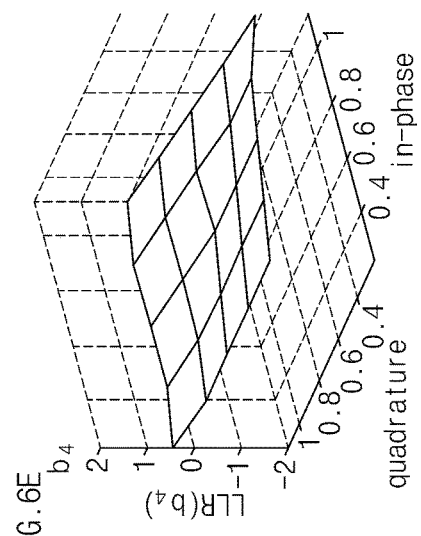
Figure 6D:
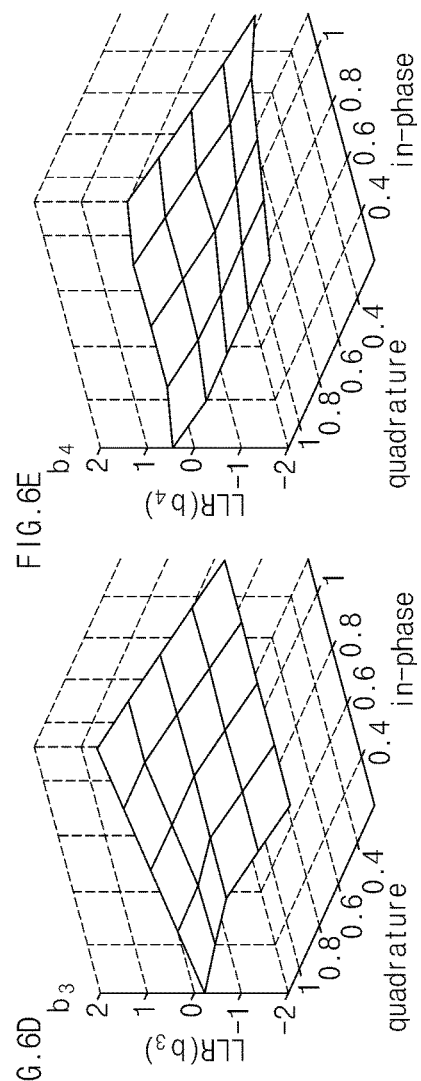
Figure 6C:
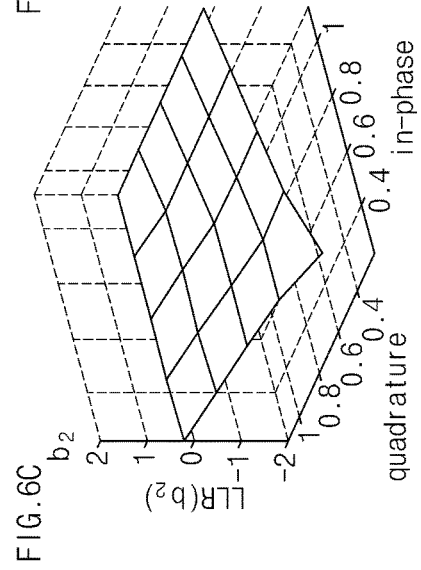

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, some exemplary embodiments of the present invention will be described in detail with reference to the exemplary drawings. When reference numerals refer to components of each drawing, it is noted that although the same components are illustrated in different drawings, the same components are designated by the same reference numerals as possible. In describing the exemplary embodiments of the present invention, when it is determined that the detailed description of the known components and functions related to the present invention may obscure understanding of the exemplary embodiments of the present invention, the detailed description thereof will be omitted.

Terms such as first, second, A, B, (a), (b), and the like may be used in describing the components of the exemplary embodiments of the present invention. The terms are only used to distinguish a component from another component, but nature or an order of the component is not limited by the terms. Further, if it is not contrarily defined, all terms used herein including technological or scientific terms have the same meanings as those generally understood by a person with ordinary skill in the art. Terms which are defined in a generally used dictionary should be interpreted to have the same meaning as the meaning in the context of the related art, and are not interpreted as ideal or excessively formal meanings unless clearly defined in the present application.

FIG. 1 is a diagram illustrating a configuration of an apparatus for soft-decision demodulating in non-square quadrature amplitude modulation according to the present invention.

Referring to FIG. 1, the apparatus for soft-decision demodulating according to the present invention may include a signal receiving unit 100, a soft-decision bit calculating unit 120, and a signal decoding unit 130.

The signal receiving unit 100 may receive a QAM-modulated signal at a transmitting side. The signal received through the signal receiving unit 100 acquires m soft-decision bit values through the soft-decision bit calculating unit 120 and the signal decoding unit 130 decodes the received signal by using m soft-decision bit values acquired through the soft-decision bit calculating unit 120. In this case, the signal decoding unit 130 extracts an information bit for an original signal of the transmitting side as a signal decoding result.

Herein, a quadrature amplitude modulation (QAM) scheme is a modulation scheme that transmits data to an I (in-phase) channel and a Q (quadrature) channel which are two independent carriers by using an amplitude and a phase. In this case, in a square QAM scheme having even bits, since an I channel value and a Q channel value are transmitted independently from each other, demodulation is available independently at a receiving side. Meanwhile, in a non-square QAM scheme having odd bits, since 3 bits among bits included in one QAM symbol interlock with each other, simple demodulation is difficult.

Therefore, the present invention is intended to propose a method which can more simplify soft-decision bit calculation. The detailed description thereof will be made based on a configuration of the soft-decision bit calculating unit 120.

First, the received signal as a QAM-demodulated signal may be expressed as shown in [Equation 1] given below.

$$y[n]=h[n]\cdot s[n]+w[n] \qquad \text{[Equation 1]}$$

In [Equation 1], y[n] represents the received signal, h[n] represents a channel gain of the received signal, s[n] represents a transmitted QAM symbol in which average power is 1, and w[n] represents complex additive white Gaussian noise in which an average is 0 and a distribution is $\sigma^2$.

A soft-decision bit determining unit may detect a soft-decision bit value of a QAM-modulated symbol by using a log likelihood ratio (LLR).

Herein, the log likelihood ratio of the bit may be calculated by using a sub-optimal log likelihood ratio calculation equation by approximating the log likelihood ratio (LLR) by a max-log scheme.

In this case, the sub-optimal log likelihood ratio calculation equation may be expressed as shown in [Equation 2] given below.

$$LLR(b_k) = \frac{|h[n]|^2}{4}\left\{\min_{\alpha \in S_k^{(1)}}|y[n]-\alpha|^2 - \min_{\beta \in S_k^{(0)}}|y[n]-\beta|^2\right\} \qquad \text{[Equation 2]}$$

Herein, $b_k$ represents a k-th bit, h[n] represents the channel gain of the received signal, y[n] represents the received signal, $S_k^{(1)}$ represents a set of QAM symbols where $b_k=1$, and $S_k^{(0)}$ represents a set of QAM symbols where $b_k=0$.

First, when [Equation 2] is used, a log likelihood ratio value for 5 bits of 32QAM may be calculated. The 32QAM is constituted by 5 bits and constellation points when bit values are 0 and 1 at respective bit positions are described with reference to FIGS. 2A to 2E.

In the case where the channel gain h[n] of the received signal is 1, when a 32QAM constellation point illustrated in FIGS. 2A to 2E are applied to [Equation 2], the sub-optimal log likelihood ratio calculation equation for 2 bits $\{b_0, b_1\}$ may be derived as shown in [Equation 3] given below.

$$LLR(b_0) = \begin{cases} y_I[n] & |y_I[n]| \le 2d \\ 2(y_I[n]-1d) & 2d < y_I[n] \le 4d \\ 3(y_I[n]-2d) & y_I[n] > 4d \\ 2(y_I[n]+1d) & -4d \le y_I[n] < -2d \\ 3(y_I[n]+2d), & y_I[n] < -4d \end{cases} \qquad \text{[Equation 3]}$$

$$LLR(b_1) = \begin{cases} y_Q[n] & |y_Q[n]| \le 2d \\ 2(y_Q[n]-1d) & 2d < y_Q[n] \le 4d \\ 3(y_Q[n]-2d) & y_Q[n] > 4d \\ 2(y_Q[n]+1d) & -4d \le y_Q[n] < -2d \\ 3(y_Q[n]+2d), & y_Q[n] < -4d \end{cases}$$

In [Equation 3], $y_I[n]$ represents an in-phase value, $y_Q[n]$ represents a quadrature value, and d represents a distance value of a partition boundary when the bits $b_k=1$ and $b_k=0$. Herein, d has values of $1/\sqrt{20}$, $2/\sqrt{82}$, $4/\sqrt{330}$, $8/\sqrt{1322}$, and $16/\sqrt{5290}$ in 32QAM, 128QAM, 512QAM, 2048QAM, and 8192QAM, respectively.

In this case, in [Equation 3], a log likelihood ratio for $b_1$ may be acquired by changing $y_I[n]$ to $y_Q[n]$ in LLR(b0).

Meanwhile, in FIGS. 2A to 2E, absolute values for in-phase and quadrature values of constellation points for 3 bits $\{b_2, b_3, b_4\}$ may be expressed as shown in FIGS. 3A to 3C. Herein, FIGS. 3A to 3C illustrate a first-quadrant constellation point and an equation calculated with respect to a first quadrant may be similarly applied to the remaining quadrants.

When the 32QAM constellation point illustrated in FIGS. 3A to 3C are applied to [Equation 2], the sub-optimal log likelihood ratio calculation equation for 3 bits $\{b_2, b_3, b_4\}$ may be derived as shown in [Equation 4] given below.

[Equation 4]

$$LLR(b_2) = \begin{cases} |y_Q[n]|-4d & |y_Q[n]| > 2d, |y_Q[n]| > |y_I[n]| \\ |y_I[n]|-4d & |y_I[n]| > 2d, |y_Q[n]| < |y_I[n]| \\ 2(|y_Q[n]|-3d) & 0 \le |y_I[n]|, |y_Q[n]| \le 2d, |y_Q[n]| \ge |y_I[n]| \\ 2(|y_I[n]|-3d), & 0 \le |y_I[n]|, |y_Q[n]| \le 2d, |y_Q[n]| \le |y_I[n]| \end{cases}$$

$$LLR(b_3) = \begin{cases} |y_I[n]|-2d & |y_Q[n]| \ge -|y_I[n]|+6d, |y_Q[n]| \ge |y_I[n]|, |y_I[n]| \ge 4d \\ -|y_Q[n]|+4d & |y_Q[n]| < -|y_I[n]|+6d, |y_Q[n]| > 3d, |y_I[n]| < 2d \\ |y_I[n]|-|y_Q[n]|+2d & |y_Q[n]| \ge 0.5|y_I[n]|+2d, 2d \le |y_I[n]| \le 4d, 2d \le |y_Q[n]| \le 4d \\ |y_Q[n]|-2d, & \text{elsewhere} \end{cases}$$

$$LLR(b_4) = \begin{cases} -|y_I[n]|+|y_Q[n]|-2d & |y_I[n]| \le 2d, |y_Q[n]| \ge 4d \\ |y_Q[n]|-4d & |y_Q[n]| > -|y_I[n]|+6d, 2d \le |y_I[n]| \le 4d \\ -|y_I[n]|+|y_Q[n]| & |y_I[n]| > 4d, |y_Q[n]| > 2d \\ 2(-|y_I[n]|+3d) & |y_I[n]| \ge 4d, |y_Q[n]| \le 2d \\ -|y_I[n]|+2|y_Q[n]|-2d & |y_Q[n]| \ge -0.5|y_I[n]|+4d, |y_I[n]| \ge 4d \\ -|y_I[n]|+2d, & \text{elsewhere} \end{cases}$$

A log likelihood ratio of 5 bits $\{b_0, b_1, b_2, b_3, b_4\}$ calculated through [Equation 3] and [Equation 4] may be used to examine a capability of [Equation 7] to be described below.

FIGS. 4A to 4E illustrate boundary points for calculating log likelihood ratios of 2 bits $\{b_0, b_1\}$ and 3 bits $\{b_2, b_3, b_4\}$ by using [Equation 3] and [Equation 4]. The exemplary embodiment of FIGS. 4A to 4E illustrate a boundary point for a k-th bit (k=0, 1, 2, 3, 4) based on the first quadrant of the 32QAM constellation point.

In this case, as known through [Equation 3], in respect to the log likelihood ratio values for 2 bits $\{b_0, b_1\}$, $b_0$ may be calculated by using only the $y_I[n]$ value and $b_1$ may be calculated by using only the $y_Q[n]$ value.

Meanwhile, as known through [Equation 4], it is difficult to independently separate $b_2$, $b_3$, and $b_4$ with respect to 3 bits $\{b_2, b_3, b_4\}$ and the log likelihood ratio value for 3 bits $\{b_2, b_3, b_4\}$ may be calculated only when using both the $y_I[n]$ and $y_Q[n]$ values.

Therefore, [Equation 3] and [Equation 4] are approximated to derive a log likelihood ratio calculation equation as shown in [Equation 5] given below so as to reduce complexity of soft-decision bit calculation and be applied even to high-degree non-square QAM such as $8192(=2^{13})$QAM.

[Equation 5]

$$LLR(b_0) \cong y_I[n]$$

$$LLR(b_1) \cong y_Q[n]$$

$$LLR(b_2) \cong \begin{cases} |y_Q[n]| - 4d & |y_Q[n]| > |y_I[n]| \\ |y_I[n]| - 4d, & \text{elsewhere} \end{cases}$$

$$LLR(b_3) \cong$$
$$\begin{cases} \max(|y_I[n]| - 2d, -|y_Q[n]| + 4d) & |y_Q[n]| > 3d, |y_Q[n]| > |y_I[n]| \\ |y_Q[n]| - 2d, & \text{elsewhere} \end{cases}$$

$$LLR(b_4) \cong \begin{cases} -|y_I[n]| + |y_Q[n]| & |y_I[n]| > 4d, |y_Q[n]| > 2d \\ \max\begin{pmatrix} -|y_I[n]| + |y_Q[n]| - 2d, \\ |y_Q[n]| - 4d \\ -|y_I[n]| + 2d \end{pmatrix}, & \text{elsewhere} \end{cases}$$

The boundary points for calculating the log likelihood ratios of 2 bits $\{b_0, b_1\}$ and 3 bits $\{b_2, b_3, b_4\}$ by using [Equation 5] are expressed as illustrated in FIGS. 5A to 5E. The exemplary embodiment of FIGS. 5A to 5E illustrate the boundary point for the k-th bit (k=0, 1, 2, 3, 4) based on the first quadrant of the 32QAM constellation point. It can be seen that the complexity of the boundary point in FIGS. 5A to 5E are simplified as compared with FIGS. 4A to 4E.

FIGS. 6A to 6E illustrate a sub-optimal log likelihood ratio value when [Equation 2] satisfies a condition of $d \leq y_I[n]$, $y_Q[n] \leq 5d$ ($d=1/\sqrt{20}$) in the 32QAM. Meanwhile, FIGS. 7A to 7E illustrate a difference value between the sub-optimal log likelihood ratio value when [Equation 2] satisfies the condition of $d \leq y_I[n]$, $y_Q[n] \leq 5d$ ($d=1/\sqrt{20}$) in the 32QAM and a log likelihood ratio value when the sub-optimal log likelihood ratio value is applied to [Equation 5].

As illustrated in FIGS. 7A to 7E, they can be seen that a difference in log likelihood ratio value for $b_0$ among 2 bits $\{b_0, b_1\}$ increases as the in-phase value increases. Therefore, since an area in which the in-phase value is large with respect to $b_0$ is an area having high reliability, the difference may not significantly influence performing LDPC demodulation through the corresponding equation.

It can be seen that a difference in log likelihood ratio value for b1 increases as the quadrature value increases. Therefore, since an area in which the quadrature value is large with respect to $b_1$ is an area having high reliability, the difference may not significantly influence performing the LDPC demodulation through the corresponding equation.

It can be seen that there is little difference in log likelihood ratio value for 3 bits $\{b_2, b_3, b_4\}$. Therefore, when [Equation 5] is used in the 32QAM, the log likelihood ratio values for 2 bits $\{b_0, b_1\}$ and 3 bits $\{b_2, b_3, b_4\}$ may be more easily obtained.

FIGS. 8A to 8C illustrate a difference value between the sub-optimal log likelihood ratio value calculated through [Equation 2] and the log likelihood ratio value calculated through [Equation 5] in 128QAM.

First, in 128QAM, the value of d may be $2/\sqrt{82}$. In this case, a difference value between the sub-optimal log likelihood ratio values for 3 bits $\{b_2, b_3, b_4\}$ among 5 bits $\{b_0, b_1, b_2, b_3, b_4\}$ when $d=2/\sqrt{82}$ in [Equation 2] and a log likelihood ratio value when the sub-optimal log likelihood ratio value is applied to [Equation 5] may be verified through FIGS. 8A to 8C.

As illustrated in FIGS. 8A to 8C, the log likelihood ratio values for $b_2$, $b_3$, and $b_4$ indicate differences from the sub-optimal log likelihood ratios in a partial area, but a difference in the corresponding area may not significantly influence performing LDPC decoding through the corresponding equation.

Therefore, in the 128QAM, [Equation 5] is applied to calculate log likelihood ratio values for 5 bits $\{b_0, b_1, b_2, b_3, b_4\}$.

Meanwhile, in the 128QAM, since log likelihood ratio values for a total of 7 bits $\{b_0, b_1, b_2, b_3, b_4, b_5, b_6\}$ need to be calculated, a log likelihood ratio calculation equation for the remaining 2 bits $\{b_5, b_6\}$ may be expressed as shown in [Equation 6] given below.

$$LLR(b_5) = -(||y_Q[n]| - 2d| - 2d| - d)$$

$$LLR(b_6) = -(||y_I[n]| - 2d| - 2d| - d) \quad [\text{Equation 6}]$$

As shown in [Equation 6], a log likelihood ratio value for $b_5$ between 2 bits $\{b_5, b_6\}$ may be calculated by using only the $y_Q[n]$ value and a log likelihood ratio value for $b_6$ may be calculated by using only the $y_I[n]$ value. Therefore, the log likelihood ratio values of 2 bits $\{b_5, b_6\}$ may be calculated with the in-phase and quadrature values similarly to 2 bits $\{b_0, b_1\}$, respectively.

As one example, an operation of calculating the log likelihood ratio for $b_5$ by using [Equation 6] are illustrated in FIGS. 9A to 9I. Herein, the exemplary embodiment of FIGS. 9A to 9I will be described based on the first quadrant in the 128QAM constellation point.

Figure 9I:
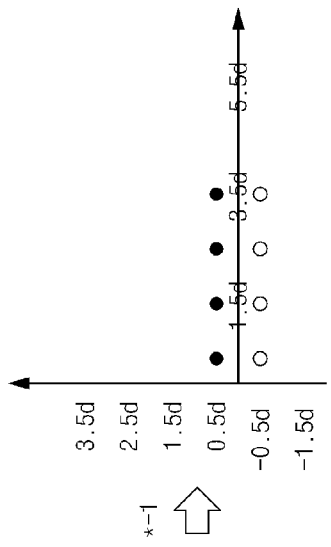

Referring to FIGS. 9A to 9I, when constellation points where the $y_Q[n]$ value is equal to or less than 2d are removed from constellation points positioned on the first quadrant of the 128QAM constellation point in FIG. 9A, a form like FIG. 9B is formed and when absolute values (ABS) of the constellation points of FIG. 9B are taken, a form like FIG. 9C is formed.

When constellation points where the $y_Q[n]$ value is equal to or less than 2d as illustrated in FIG. 9D are removed from the constellation points of FIG. 9C, a form like FIG. 9E is formed and when absolute values (ABS) of the constellation points of FIG. 9E are taken, a form like FIG. 9F is formed.

Figure 9H:
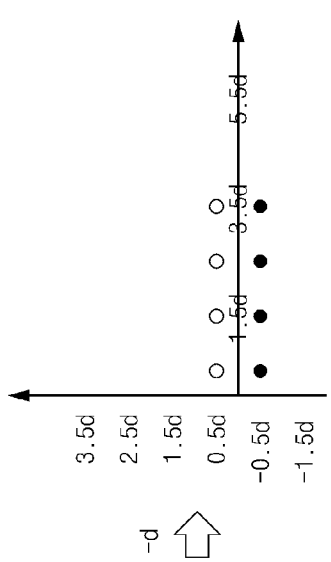
Figure 9G:
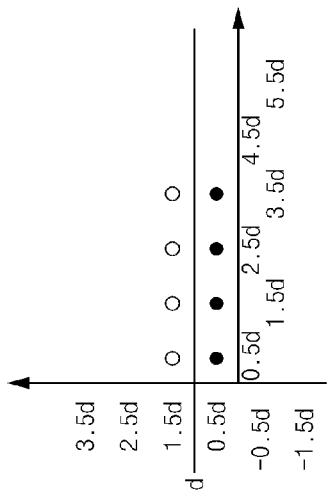

When constellation points where the $y_Q[n]$ value is equal to or less than 1d as illustrated in FIG. 9G are removed from the constellation points of FIG. 9F, a form like FIG. 9H is formed, when '-' of the constellation points of FIG. 9H is taken, a form like FIG. 9I is formed, and the log likelihood ratio value for $b_5$ may be calculated from the constellation points of FIG. 9I.

By such a scheme, the log likelihood ratio for $b_6$ may be calculated.

Therefore, when the log likelihood ratio calculation equation for each bit in the non-square QAM is arranged from [Equation 5] and [Equation 6], the log likelihood ratio calculation equation may be expressed as shown in [Equation 7].

[Equation 7]

$$LLR(b_0) \cong y_I[n]$$

$$LLR(b_1) \cong y_Q[n]$$

$$LLR(b_2) \cong \begin{cases} |y_Q[n]| - 4d & |y_Q[n]| > |y_I[n]| \\ |y_I[n]| - 4d, & \text{elsewhere} \end{cases}$$

-continued $$LLR(b_3) \cong$$

$$\begin{cases} \max(|y_I[n]| - 2d, -|y_Q[n]| + 4d) & |y_Q[n]| > 3d, |y_Q[n]| > |y_I[n]| \\ |y_Q[n]| - 2d, & \text{elsewhere} \end{cases}$$

$$LLR(b_4) \cong \begin{cases} \max\begin{pmatrix} -|y_I[n]| + |y_Q[n]| \\ -|y_I[n]| + |y_Q[n]| - 2d, \\ |y_Q[n]| - 4d \\ -|y_I[n]| + 2d \end{pmatrix}, & |y_I[n]| > 4d, |y_Q[n]| > 2d \\ \text{elsewhere} \end{cases}$$

$$LLR(b_{k,odd}) = \begin{cases} -(|||y_Q[n]| - 2d| - 2d| - d) & k = 5 \\ |b_{k-2,odd}| - d / 2^{\frac{k-5}{2}}, & k > 5 \end{cases}$$

$$LLR(b_{k,even}) = \begin{cases} -(|||y_I[n]| - 2d| - 2d| - d) & k = 6 \\ |b_{k-2,even}| - d / 2^{\frac{k-6}{2}}, & k > 6 \end{cases}$$

Therefore, the soft-decision bit calculating unit 120 may calculate the log likelihood ratio value for each bit in the non-square QAM such as 32QAM, 128QAM, 512QAM, 2048QAM, and 8192QAM through [Equation 7] and determine the soft-decision bit value based on the calculated log likelihood ratio value.

Figure 10:
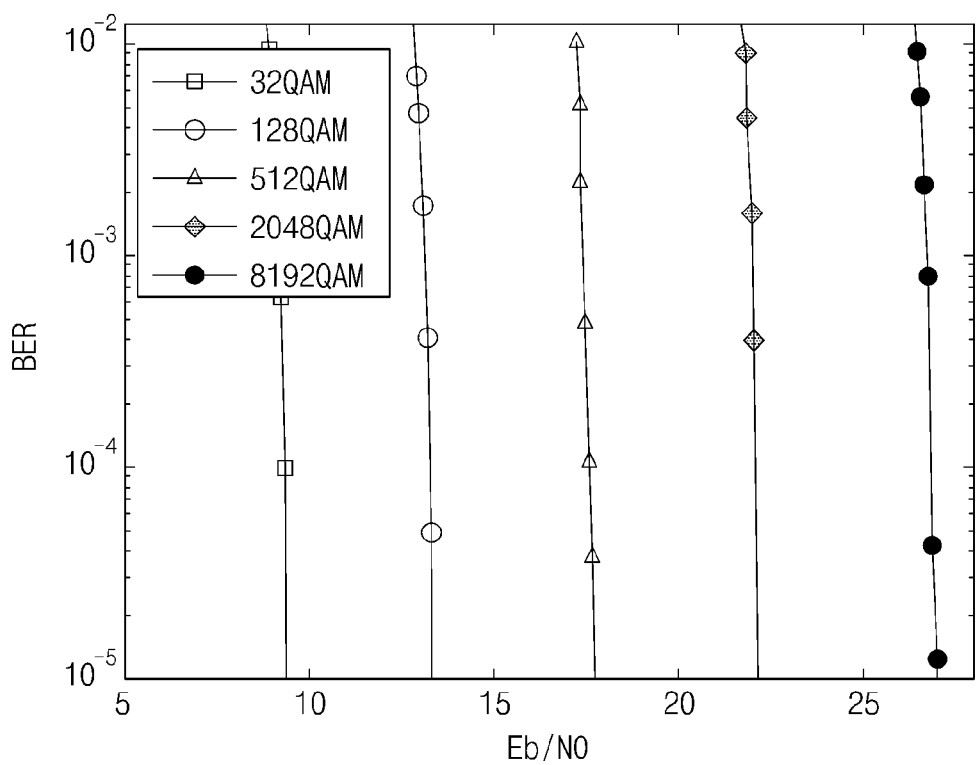
FIGS. 10 and 11 are diagrams illustrating a performance simulation experiment result of an apparatus for soft-decision demodulating in non-square quadrature amplitude modulation according to the present invention.
Figure 11:
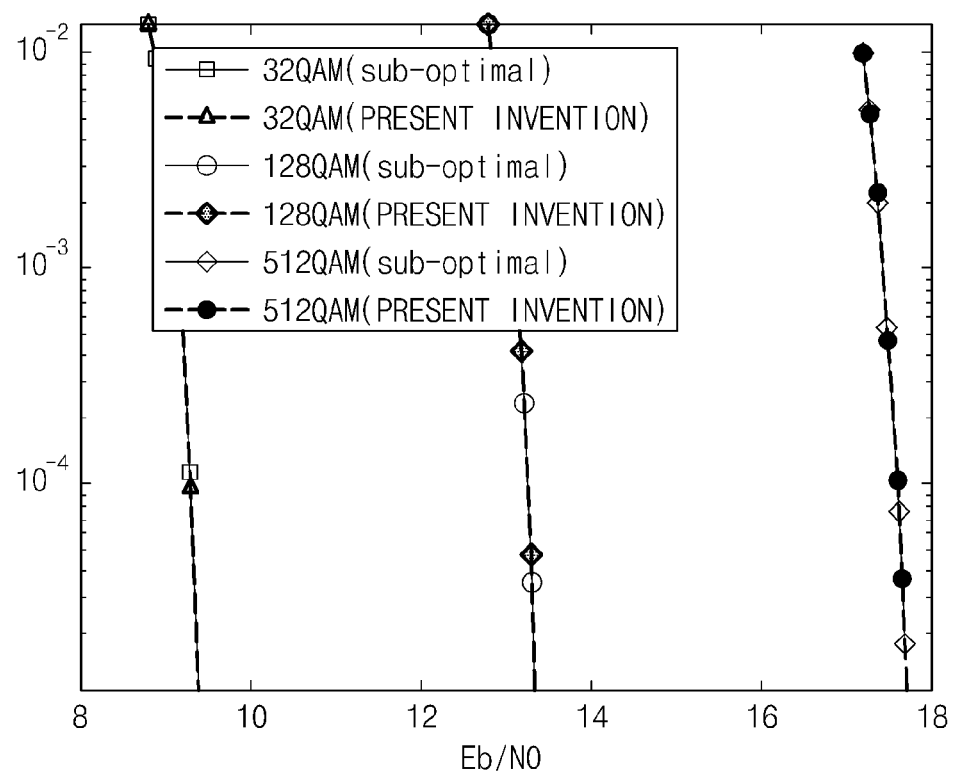

FIGS. 10 and 11 illustrate a simulation result when soft-decision demodulation is performed by using [Equation 7].

First, FIG. 10 illustrates a bit error rate when [Equation 7] is applied and illustrates a simulation result in an environment shown in [Table 1] given below.

TABLE 1

| Parameter | Value |
| --- | --- |
| LDPC | Length 16200 |
| | Ratio 8/9 |
| Channel | H[n] = 1, AWGN(0, $\sigma^2$) |
| Modulation scheme | 32, 128, 512, 2048, 8192 QAM |

FIG. 11 illustrates a bit error rate when [Equation 2] is applied and a bit error rate when [Equation 7] is applied.

In the case of a bit error rate and Eb/N0 when the sub optimal log likelihood ratio calculated by using [Equation 2] is applied, values of Eb/N0 having a bit error rate of $10^{-5}$ or less become 9.282 dB, 13.300 dB, and 17.700 dB in 32QAM, 128QAM, and 512QAM, respectively.

In the case of a bit error rate and Eb/N0 when the log likelihood ratio calculated by using [Equation 7] is applied, the values of Eb/N0 having the bit error rate of $10^{-5}$ or less become 9.389 dB, 13.307 dB, and 17.710 dB in 32QAM, 128QAM, and 512QAM, respectively.

As described above, it can be seen that a difference in capability between the case of applying the log likelihood ratio calculated by using [Equation 7] and the case of applying the sub optimal log likelihood ratio is 0.01 dB or less.

Meanwhile, [Table 2] shows comparison of calculation complexities between the sub-optimal log likelihood ratio and the present invention. In this case, calculation complexities in the case of calculating the sub optimal log likelihood ratio by applying [Equation 2] and in the case of calculating the log likelihood ratio by using [Equation 7] are shown in [Table 2].

TABLE 2

| Calculation | sub-optimal log likelihood ratio | Invention m = 5 | Invention m > 5 |
| --- | --- | --- | --- |
| Multiplying | $m(2^{m+1})$ | 24 | 36 + 2(m − 7) |
| Adding | $m(2^{m+1})$ | 5 | 13 + (m − 7) |
| Comparing | $m(2^m - 2)$ | 22 | 28 + (m − 7) |
| Sum total | $m(2^{m+2} - 1)$ | 51 | 77 + 4(m − 7) |

Herein, m represents the number of bits constituting QAM.

Referring to [Table 2], m=7 in the case of the 128QAM. In this case, in the case of calculating the sub optimal log likelihood ratio by applying [Equation 2] in the 128QAM, a total of 3577 (=7×($2^{7+2}$−1)) calculation processes are required. Meanwhile, in the case of calculating the log likelihood ratio by applying [Equation 7] in the 128QAM, only a total of 77 (=77+4×(7−7)) calculation processes are required.

Therefore, in the case of performing the soft-decision demodulation by using [Equation 7], the calculation complexity is reduced to increase efficiency while being similar in capability to the case of applying the sub optimal log likelihood ratio.

An operational flow of the apparatus for soft-decision demodulating configured as above will be described below.

Figure 12:
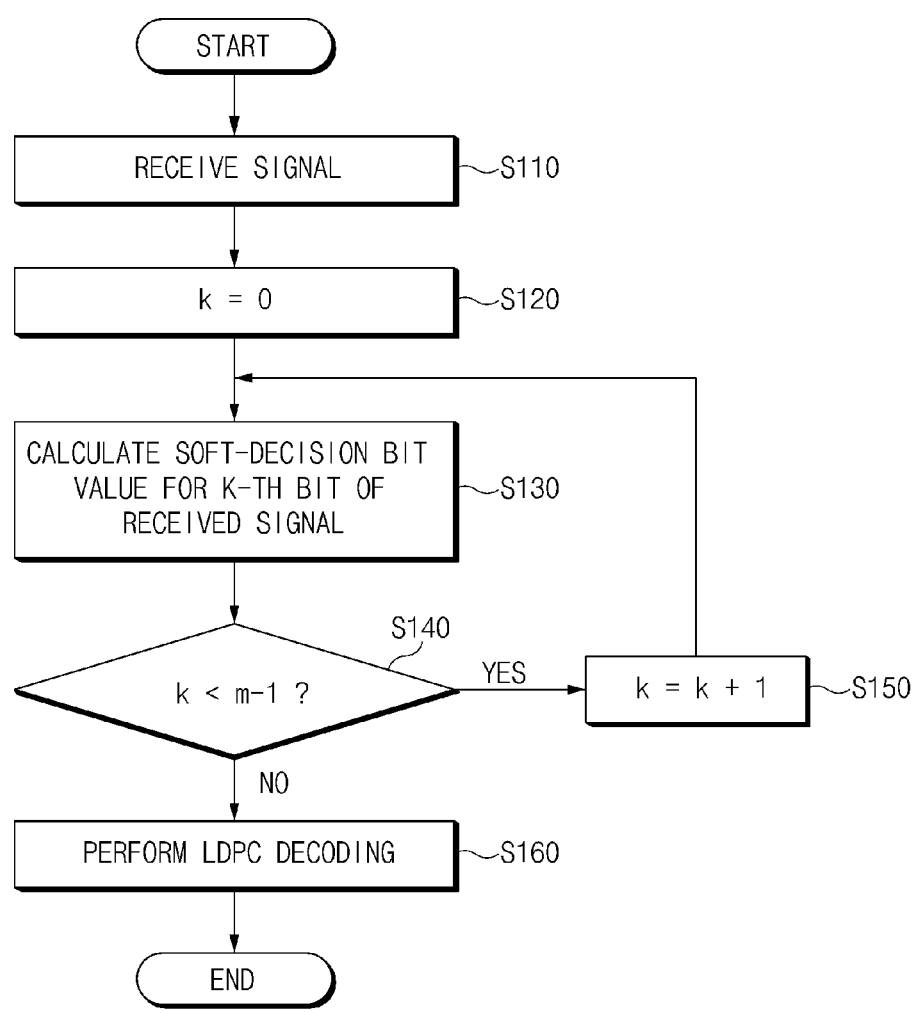
FIG. 12 is a diagram illustrating an operational flow for a method for soft-decision demodulating in non-square quadrature amplitude modulation according to the present invention.

FIG. 12 is a flowchart illustrating an operational flow for a method for soft-decision demodulating according to the present invention.

As illustrated in FIG. 12, when the apparatus for soft-decision demodulating receives a QAM modulation signal at a transmitting side through a signal receiving unit 100 (S110), the apparatus for soft-decision demodulating determines a soft-decision bit for the QAM modulation signal received during process 'S110' to perform LDPC decoding.

The QAM modulation signal received during process 'S110' includes m bits and in this case, a soft-decision bit determining unit performs processes 'S120' to 'S150' in order to calculate soft-decision bit values for m bits.

The soft-decision bit determining unit calculates a log likelihood ratio for a k-th bit by using [Equation 7] described above starting from k=0 to calculate a soft-decision bit value for the k-th bit.

As one example, when k=0 (S120), the soft-decision bit determining unit calculates a log likelihood ratio (LLR($b_0$)) through [Equation 7] for a 0-th bit to calculate the soft-decision bit value (S130) and thereafter, calculates soft-decision bit values for m bits, respectively while increasing k 1 by 1 (S130 to S150).

When calculating the soft-decision bit values for m bits is completed, a signal decoding unit 130 performs the LDPC decoding of the QAM modulation signal by using the soft-decision bit value calculated during process 'S130' to extract an information bit of an original signal (S160).

Figure 13:
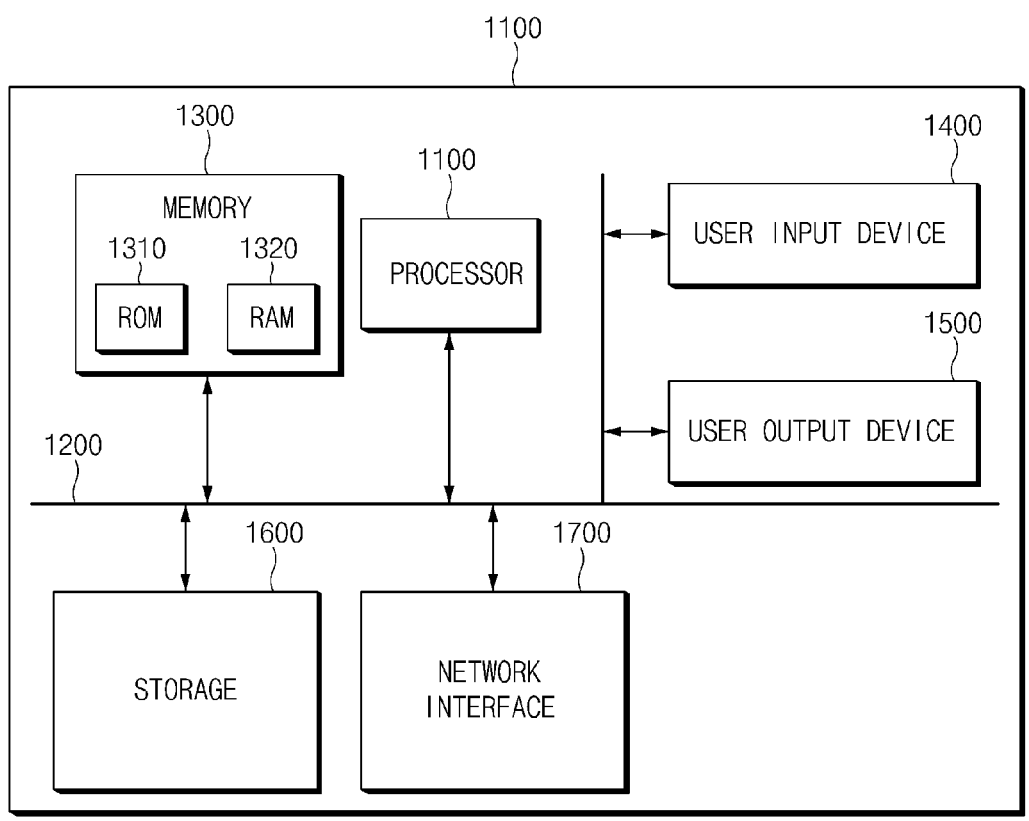
FIG. 13 is a diagram illustrating a computing system to which the apparatus according to the present invention is applied.

FIG. 13 is a diagram illustrating a computing system to which the apparatus according to the present invention is applied.

Referring to FIG. 13, the computing system 1000 may include at least one processor 1100, a memory 1300, a user interface input device 1400, a user interface output device 1500, a storage 1600, and a network interface 1700 connected through a bus 1200.

The processor 1100 may be a semiconductor device that executes processing of commands stored in a central processing unit (CPU) or the memory 1300 and/or the storage 1600. The memory 1300 and the storage 1600 may include various types of volatile or non-volatile storage media. For example, the storage medium may correspond to at least one storage medium of a flash memory, a hard disk, a multimedia card micro type, a card type memory (for example, an SD or XD memory, or the like), a magnetic memory, a magnetic disk, an optical disk, a random access memory (RAM), a static random access memory (SRMA), a read-only memory (ROM), a programmable read-only memory (PROM), and an electrically erasable programmable read-only memory (EEPROM).

Therefore, steps of a method or an algorithm described in association with the exemplary embodiments disclosed in the specification may be directly implemented by hardware and software modules executed by the processor 1100, or a combination thereof. The software module may reside in storage media (that is, the memory 1300 and/or the storage 1600) such as a RAM memory, a flash memory, a ROM memory, an EPROM memory, an EEPROM memory, a register, a hard disk, a removable disk, and a CD-ROM. The exemplary storage medium is coupled to the processor 1100 and the processor 1100 may read information from the storage medium and write the information in the storage medium. As another method, the storage medium may be integrated with the processor 1100. The processor and the storage medium may reside in an application specific integrated circuit (ASIC). The ASIC may reside in user equipment. As yet another method, the processor and the storage medium may reside in the user equipment as individual components.

The user interface input device 1400 may correspond to a soft key implemented on a display and may be input means of a type such as a mouse, a joystick, a jog shuttle, or a stylus pen.

The user interface output device 1500 may be output means such as the display, a speaker, or the like.

Herein, when the display includes a sensor sensing a touch operation, the display may be used as an input device in addition to an output device. That is, when a touch sensor such as a touch film, a touch sheet, a touch pad, or the like is provided in the display, the display may operate as a touch screen. In this case, the display may include at least one of a liquid crystal display (LCD), a thin film transistor-liquid crystal display (TFT LCD), an organic light-emitting diode (OLED), a flexible display, a field emission display (FED), and a 3D display.

The above description just illustrates the technical spirit of the present invention and various modifications and transformations can be made to those skilled in the art without departing from an essential characteristic of the present invention.

Therefore, the exemplary embodiments disclosed in the present invention are used to not limit but describe the technical spirit of the present invention and the scope of the technical spirit of the present invention is not limited by the exemplary embodiments. The scope of the present invention should be interpreted by the appended claims and it should be analyzed that all technical spirits in the equivalent range are intended to be embraced by the present invention.

What is claimed is:

1. An apparatus for soft-decision demodulating in non-square quadrature amplitude modulation, the apparatus comprising:

a signal receiving unit receiving a quadrature amplitude modulation (QAM) signal modulated using m states of modulation at a transmitting side;

a soft-decision bit calculating unit determining a soft-decision bit value by calculating log likelihood ratios (LLRs) for m bits of the received QAM modulated signal; and a signal decoding unit restoring the received QAM modulated signal based on the determined soft-decision bit value, wherein the soft-decision bit calculating unit defines a log likelihood ratio calculation equation by approximating soft-decision boundary points of constellation points for m bits of non-square QAM having odd bits, respectively, and wherein the soft-decision bit calculating unit calculates a log likelihood ratio for a third bit by using an equation given below:

$$LLR(b_2) \cong \begin{cases} |y_Q[n]| - 4d & |y_Q[n]| > |y_I[n]| \\ |y_I[n]| - 4d, & \text{elsewhere} \end{cases}$$

where $y_I[n]$ represents an I channel value, $y_Q[n]$ represents a Q channel value, and d represents a distance value of a partition boundary when the bits $b_2=1$ and $b_2=0$.

2. The apparatus of claim 1, wherein the soft-decision bit calculating unit calculates a log likelihood ratio for a first bit by using an I channel value.

3. The apparatus of claim 1, wherein the soft-decision bit calculating unit calculates a log likelihood ratio for a second bit by using a Q channel value.

4. The apparatus of claim 1, wherein the soft-decision bit calculating unit calculates a log likelihood ratio for a fourth bit by using an equation given below:

$$LLR(b_3) \cong$$
$$\begin{cases} \max(|y_I[n]| - 2d, -|y_Q[n]| + 4d) & |y_Q[n]| > 3d, |y_Q[n]| > |y_I[n]| \\ |y_Q[n]| - 2d, & \text{elsewhere} \end{cases}$$

where $y_I[n]$ represents the I channel value, $y_Q[n]$ represents the Q channel value, and d represents a distance value of a partition boundary when the bits $b_3=1$ and $b_3=0$.

5. The apparatus of claim 1, wherein the soft-decision bit calculating unit calculates a log likelihood ratio for a fifth bit by using an equation given below:

$$LLR(b_4) \cong \begin{cases} -|y_I[n]| + |y_Q[n]| & |y_I[n]| > 4d, |y_Q[n]| > 2d \\ \max\begin{pmatrix} -|y_I[n]| + |y_Q[n]| - 2d, \\ |y_Q[n]| - 4d \\ -|y_I[n]| + 2d \end{pmatrix}, & \text{elsewhere} \end{cases}$$

where $y_I[n]$ represents the I channel value, $y_Q[n]$ represents the Q channel value, and d represents a distance value of a partition boundary when the bits $b_4=1$ and $b_4=0$.

6. The apparatus of claim 1, wherein the soft-decision bit calculating unit calculates a log likelihood ratio for an even numbered bit of a sixth bit or more by using an equation given below:

$$LLR(b_{k,odd}) = \begin{cases} -(|||y_Q[n]|-2d|-2d|-d) & k=5 \\ |b_{k-2,odd}|-d\Big/2^{\frac{k-5}{2}}, & k>5 \end{cases}$$

where $y_I[n]$ represents an I channel value, $y_Q[n]$ represents a Q channel value, and d represents a distance value of a partition boundary when the bits $b_k=1$ and $b_k=0$.

7. The apparatus of claim 1, wherein the soft-decision bit calculating unit calculates a log likelihood ratio for an odd numbered bit of a seventh bit or more by using an equation given below:

$$LLR(b_{k,even}) = \begin{cases} -(|||y_I[n]|-2d|-2d|-d) & k=6 \\ |b_{k-2,even}|-d\Big/2^{\frac{k-6}{2}}, & k>6 \end{cases}$$

where $y_I[n]$ represents an I channel value, $y_Q[n]$ represents a Q channel value, and d represents a distance value of a partition boundary when the bits $b_k=1$ and $b_k=0$.

8. A method for soft-decision demodulating in non-square quadrature amplitude modulation, the method comprising:
receiving a quadrature amplitude modulation (QAM) signal modulated using m states of modulation at a transmitting side;
defining a log likelihood ratio calculation equation by approximating soft-decision boundary points of constellation points for m bits of non-square QAM having odd bits, respectively;
calculating log likelihood ratios (LLRs) for m bits of the received QAM modulated signal by using the defined log likelihood ratio calculation equation;
determining soft-decision bit values based on the calculated log likelihood ratios; and
restoring the received QAM modulated signal based on the determined soft-decision bit value,
wherein in the calculating of the log likelihood ratios (LLRs) for m bits, a log likelihood ratio for a third bit is calculated by using an equation given below:

$$LLR(b_2) = \begin{cases} |y_Q[n]|-4d & |y_Q[n]|>|y_I[n]| \\ |y_I[n]|-4d, & \text{elsewhere} \end{cases}$$

where $y_I[n]$ represents an I channel value, $y_Q[n]$ represents a Q channel value, and d represents a distance value of a partition boundary when the bits $b_2=1$ and $b_2=0$.

9. The method of claim 8, wherein in the calculating of the log likelihood ratios (LLRs) for m bits, a log likelihood ratio for a first bit is calculated by using an I channel value.

10. The method of claim 8, wherein in the calculating of the log likelihood ratios (LLRs) for m bits, a log likelihood ratio for a second bit is calculated by using a Q channel value.

11. The method of claim 8, wherein in the calculating of the log likelihood ratios (LLRs) for m bits, a log likelihood ratio for a fourth bit is calculated by using an equation given below:

$$LLR(b_3) \cong \begin{cases} \max(|y_I[n]|-2d, -|y_Q[n]|+4d) & |y_Q[n]|>3d, |y_Q[n]|>|y_I[n]| \\ |y_Q[n]|-2d, & \text{elsewhere} \end{cases}$$

where $y_I[n]$ represents the I channel value, $y_Q[n]$ represents the Q channel value, and d represents a distance value of a partition boundary when the bits $b_3=1$ and $b_3=0$.

12. The method of claim 8, wherein in the calculating of the log likelihood ratios (LLRs) for m bits, a log likelihood ratio for a fifth bit is calculated by using an equation given below:

$$LLR(b_4) \cong \begin{cases} -|y_I[n]|+|y_Q[n]| & |y_I[n]|>4d, |y_Q[n]|>2d \\ \max\begin{pmatrix} -|y_I[n]|+|y_Q[n]|-2d, \\ |y_Q[n]|-4d \\ -|y_I[n]|+2d \end{pmatrix}, & \text{elsewhere} \end{cases}$$

where $y_I[n]$ represents the I channel value, $y_Q[n]$ represents the Q channel value, and d represents a distance value of a partition boundary when the bits $b_4=1$ and $b_4=0$.

13. The method of claim 8, wherein in the calculating of the log likelihood ratios (LLRs) form bits, a log likelihood ratio for an even numbered bit of a sixth bit or more is calculated by using an equation given below:

$$LLR(b_{k,odd}) = \begin{cases} -(|||y_Q[n]|-2d|-2d|-d) & k=5 \\ |b_{k-2,odd}|-d\Big/2^{\frac{k-5}{2}}, & k>5 \end{cases}$$

where $y_I[n]$ represents the I channel value, $y_Q[n]$ represents the Q channel value, and d represents a distance value of a partition boundary when the bits $b_k=1$ and $b_k=0$.

14. The method of claim 8, wherein in the calculating of the log likelihood ratios (LLRs) for m bits, a log likelihood ratio for an odd numbered bit of a seventh bit or more is calculated by using an equation given below:

$$LLR(b_{k,even}) = \begin{cases} -(|||y_I[n]|-2d|-2d|-d) & k=6 \\ |b_{k-2,even}|-d\Big/2^{\frac{k-6}{2}}, & k>6 \end{cases}$$

where $y_I[n]$ represents the I channel value, $y_Q[n]$ represents the Q channel value, and d represents the distance value of a partition boundary when the bits $b_k=1$ and $b_k=0$.

15. An apparatus for soft-decision demodulating in non-square quadrature amplitude modulation, the apparatus comprising:
a signal receiving unit receiving a quadrature amplitude modulation (QAM) signal modulated using m states of modulation at a transmitting side;
a soft-decision bit calculating unit determining a soft-decision bit value by calculating log likelihood ratios (LLRs) for m bits of the received QAM modulated signal; and
a signal decoding unit restoring the received QAM modulated signal based on the determined soft-decision bit value, wherein the soft-decision bit calculating unit defines a log likelihood ratio calculation equation by approximating soft-decision boundary points of constellation points for m bits of non-square QAM having odd bits, respectively, and wherein the soft-decision bit calculating unit calculates a log likelihood ratio for a fourth bit by using an equation given below:

$$LLR(b_3) \cong \begin{cases} \max(|y_I[n]| - 2d, -|y_Q[n]| + 4d) & |y_Q[n]| > 3d, |y_Q[n]| > |y_I[n]| \\ |y_Q[n]| - 2d, & \text{elsewhere} \end{cases}$$

where $y_I[n]$ represents the I channel value, $y_Q[n]$ represents the Q channel value, and d represents a distance value of a partition boundary when the bits $b_3=1$ and $b_3=0$.

* * * * *